UNITED STATES PATENT OFFICE.

CHARLES H. FRINGS AND BERTHA O. FRINGS, OF NEW YORK, N. Y., ASSIGNORS TO THE BREWING IMPROVEMENT COMPANY, OF MAYWOOD, NEW JERSEY.

METHOD OF HOPPING MALT LIQUORS.

SPECIFICATION forming part of Letters Patent No. 478,189, dated July 5, 1892.

Application filed March 3, 1892. Serial No. 423,655. (No specimens.)

*To all whom it may concern:*

Be it known that we, CHARLES H. FRINGS and BERTHA O. FRINGS, citizens of the United States, and residents of New York, in the county and State of New York, have invented certain new and useful Improvements in Methods of Hopping Malt Liquors, of which the following is a specification.

Our invention relates to improvements in the method of hopping malt liquors; and its object is to increase the solubility of the bitter principle of hops and to facilitate the fermentation, clarification, and finishing of malt liquors. The main constituents of hops (comprising the strobiles and the lupuline) consist, besides the astringent matter, of a hard resin and of different soft resins, (oleoresins,) which latter are intimately associated with the bitter and the aromatic principles of hops. By a protracted cooking of the hops in beer-wort, which is the general practice, a portion of the resins is extracted, giving off to the wort a proportionate amount of the bitter principle, while the aromatic oil volatilizes and is almost entirely lost when no special arrangements for regaining it have been made. On cooling of the wort the resins separate and are held in suspension only, in that state more or less interfering with the action of the yeast and sometimes even paralyzing fermentation. Considerable portions of the resins are carried to the top of the fermenting-vessel by the carbonic-acid gas generated during fermentation and are either removed by skimming or overflow or permitted to sink and settle at the bottom when fermentation declines. Other portions of the resins are gradually dissolved and held in solution by the attenuating wort, which forms a hydro-alcoholic menstruum, and the bitter flavor of the fermented beer is due, mainly, to this solution, which, however, is not always a saturated one, especially not in malt liquors produced by the so-called "top fermentation," to which frequently dry hops are added in order to intensify the bitter flavor and at the same time to impart a distinct hop aroma. The hops of commerce, however, as well as freshly-gathered hops, are always more or less covered with micro-organisms, which may develop in the beer, thereby causing obnoxious secondary fermentations. On the other hand, when main fermentation, produced by "bottom yeast," ceases the malt liquors most always contain an excess of undissolved resins held in suspension, the presence of which interferes with speedy clarification. To overcome these difficulties, we use for hopping malt liquors torrefied hops, which we prepare in the following manner: The hops of commerce or freshly-gathered hops, (strobiles and lupuline,) preferably comminuted, are placed into a suitable kiln, open vessel, or apparatus, in which they are exposed to the action of a gradually-increased dry heat until at least heated beyond drying or parched. For this purpose the final temperature of the hops extends from 212° Fahrenheit upward, according to the age and other conditions of the hops and to the degree of browning and the amount of empyreumatic products which it is desired to obtain for preparing special kinds of malt liquors. By this method of torrefying the agreeable aromatic principle of good well-preserved hops, as well as the malodorous products of oxidation contained in old deteriorated hops, will escape, but may from good hops be easily collected and be used for imparting a specific hop aroma to fermented malt liquors.

The advantages connected with our method of torrefying hops are the following:

First. The resins undergo a chemical change, by which their intimate association with the bitter principle of the hops is broken up, so that the latter can be fully extracted by repeatedly treating the hops with water or any other aqueous menstruum, whereas the resins as they exist in freshly-gathered hops or in the hops of commerce become the more insoluble the longer or oftener they are treated with water or cooked in beer-wort.

Secondly. The seeds, stems, and other parts or constituents of untorrefied hops, which are liable to impart an acrid flavor to wort or beer, are either rendered tasteless or are, if of a volatile nature, so completely eliminated that even old deteriorated hops will, as far as the extraction of the bitter principle is concerned, be as useful for brewing purposes as the best hops.

Thirdly. That portion of the resins which otherwise tenaciously remains in suspension in wort or beer will quickly subside and thereby greatly accelerate clarification.

Fourthly. The hops torrefied to the described extent can, as already intimated, be repeatedly used for imparting a bitter flavor to new wort, and it needs only to add to spent hops a proportionate amount of unextracted torrefied hops, and, if desired, some tannin, in order to supply certain extractive and astringent bodies in which spent hops are deficient.

Fifthly. The hops torrefied by our method will keep indefinitely if only protected against moisture and will form a useful article of commerce.

Sixthly. A variety of aqueous extracts of hops torrefied by our method can be produced by treating the hops with water either by maceration, infusion, or boiling, followed by expression or by any other of the well-known methods of extracting vegetable substances, and, if desired, these aqueous extracts may be concentrated or dried by evaporation, preferably *in vacuo*, and be used as articles of commerce. If treated with cold water only, a practically non-resinous bitter extract is obtained, which can be used for different purposes besides the hopping of malt liquors; but if treated with tepid or warm water the more of the resins will be extracted the higher the temperature of the menstruum, which resins, however, if not present in excess, will be dissolved by the alcohol formed during the attenuation of the beer-worts. On the other hand, the torrefied hops can be fully exhausted when repeatedly treated with hot or boiling water, preferably under pressure. The extract thus obtained fully represents the dry hops treated by our method of torrefying.

Our method of hopping malt liquors with torrefied hops consists in adding the hops in their dry state to the beer-wort at any suitable time or times for the purpose of extraction. Some modification of this method may be adopted for the purpose of accelerating the extraction of the hops in the viscous wort by previously digesting them with water, as follows: The torrefied hops are moistened with about ten gallons of water of ordinary temperature to every hundred pounds of the hops and left for maceration during a few hours, whereby they gradually increase in bulk and become softened. After this there may be added an additional ten gallons of water of ordinary or higher temperature and the hops be left for further digestion as long as desired. The whole of the hops, together with the liquid incidentally obtained, is then united with the wort.

Another obvious modification of the method of hopping malt liquors is the addition to beer-wort of one of the different extracts obtained as hereinbefore described. As to "dry hopping" of fermented beer, the addition of torrefied hops will prevent the development of any of the micro-organisms with which fresh or commercial hops are fraught, for these organisms are fully destroyed by the degree of dry heat required in our method of torrefying.

We are aware that in some parts of Germany for the purpose of removing from hops the so-called "grassy taste" the hops are heated in the empty boiling kettle or pan until aromatic vapors arise, (at a temperature of about 180° Fahrenheit,) when for the purpose of preventing charring a small portion of wort is added, in which the more or less dried hops are stewed until a dark-colored pulpy mass is obtained, to which the balance of the wort is added. We do not claim this process of drying and stewing, which is called "the roasting of hops." Neither do we claim the use of simply dried hops, nor do we claim in this specification the production of an aqueous extract of torrefied or roasted hops from which the hops have been removed.

What we claim as our invention, and desire to secure by United States Letters Patent, is—

1. The herein-described method of preparing hops for brewing, which consists in subjecting the hops to the action of dry heat until heated beyond drying or at least parched, substantially as and for the purpose specified.

2. The within-described method of hopping beer, which consists in subjecting the hops to the action of a dry heat until heated beyond drying or at least parched and then adding the hops thus prepared to the wort, in the manner specified.

In testimony that we claim the foregoing as our invention we have signed our names, in presence of two witnesses, this 16th day of February, 1892.

CHARLES H. FRINGS.
BERTHA O. FRINGS.

Witnesses:
A. FABER DU FAUR,
KLAS H. TERNSTEDT.